(12) United States Patent
Vanderstraeten (10) Patent No.: US 6,393,850 B1
(45) Date of Patent: May 28, 2002

(54) DEVICE AND METHOD FOR PERFORMING A DEHUMIDIFYING OPERATION

(75) Inventor: Bart Etienne Agnes Vanderstraeten, Haacht (BE)

(73) Assignee: Atlas Copco Airpower, Wilrijk (BE)

( * ) Notice: Subject to any disclaimer, the term of this patent is extended or adjusted under 35 U.S.C. 154(b) by 0 days.

(21) Appl. No.: 09/718,358

(22) Filed: Nov. 24, 2000

(30) Foreign Application Priority Data

Nov. 24, 1999 (BE) .............................................. 9900761

(51) Int. Cl.[7] .......................... F25B 41/00; F25B 45/00; F25D 17/06
(52) U.S. Cl. .......................... 62/196.3; 62/93; 62/228.4
(58) Field of Search ........................ 62/93, 196.3, 228.4

(56) References Cited

U.S. PATENT DOCUMENTS

| | | | | |
|---|---|---|---|---|
| 4,235,081 A | * | 11/1980 | Dowling | 62/93 |
| 4,446,704 A | * | 5/1984 | Yamazaki et al. | 62/180 |
| 4,484,451 A | * | 11/1984 | Darm | 62/90 |
| 4,829,778 A | * | 5/1989 | Schlensker | 62/272 |
| 5,129,234 A | * | 7/1992 | Alford | 62/176.6 |
| 5,323,617 A | * | 6/1994 | Ichikawa | 62/129 |
| 5,345,776 A | * | 9/1994 | Komazaki et al. | 62/176.3 |
| 5,537,830 A | * | 7/1996 | Goshaw et al. | 62/201 |
| 5,673,568 A | * | 10/1997 | Isshiki | 62/228.4 |
| 5,845,505 A | * | 12/1998 | Galus et al. | 62/95 |
| 5,983,651 A | * | 11/1999 | Huang | 62/152 |

FOREIGN PATENT DOCUMENTS

| | | | | |
|---|---|---|---|---|
| JP | | 78187 | * 6/1980 | 62/93 |

* cited by examiner

Primary Examiner—William C. Doerrler
(74) Attorney, Agent, or Firm—Bacon & Thomas, PLLC (57) ABSTRACT

The invention relates to a device for cool-drying, comprising a heat exchanger (1), the primary part of which is the evaporator (2) of a cooling circuit (3) which further comprises a compressor (5) driven by an electric motor (4) being bridged-over by means of a bypass (17) with therein a bypass-closing element (18) and an open/closed closing element (19). The secondary part (1A) of the heat exchanger (1) forms part of a conduit (9) for the gas and, at the outlet of this heat exchanger (1), a liquid separator (11) is disposed. The device comprises means (15) for regulating the speed of the motor (4), which means are controlled by means of a control device (16) in function of the value measured by the measuring means (22, 22A).

34 Claims, 4 Drawing Sheets

DEVICE AND METHOD FOR PERFORMING A DEHUMIDIFYING OPERATION

BACKGROUND OF THE INVENTION

A) Field of the Invention

This invention relates to a device for dehumidifying by cool-drying a gas and comprises a heat exchanger, the primary part of which is the evaporator of a cooling circuit which further comprises a compressor driven by an electric motor, a condensor, an expansion means between the outlet of the condenser and the inlet of the evaporator, a control device for controlling said motor and measuring means coupled thereto, whereby the compressor is bridged-over by a bypass with therein a bypass-closing element or valve and an open/closed valve or element, whereas the secondary part of the heat exchanger forms part of a conduit for the gas and whereby, at the outlet of said heat exchanger, a liquid separator is disposed in said conduit.

Amongst others, such devices are used for drying compressed air.

B) Discussion of the Related Art

Compressed air delivered by a compressor in most cases is saturated with water vapour or, in other words, has a relative humidity of 100%. This means that condensation will occur with the least drop of temperature. Due to the condensation water, corrosion will occur in conduits and instruments and the devices will show a premature wear and tear.

Therefore, the compressed air is dried, which can be performed in the aforementioned manner by means of cool-drying. Also, other air than compressed air or other gases may be dried in this manner.

Cool-drying is based upon the principle that by lowering the temperature, moisture condenses from the air or the gas, after which the condensation water is separated in the liquid separator and after which the air or the gas is reheated, as a result of which said air or said gas no longer is saturated. The heat is removed from the evaporator by means of the cooling circuit.

The same is valid for other gases than air and each time reference is made to air in the following, the same is also valid for other gases than air.

In practice, there is an ISO standard which determines which can be the dew point and the corresponding lowest air temperature for reference conditions.

In order to prevent that the lowest air temperature becomes smaller than 0° C. and, as a result, the evaporator would freeze up due to freezing-on moisture, it is a necessary requirement that the evaporator temperature is higher than 0° C.

In order to fulfil this requirement, the measuring means can be provided at the inlet of the evaporator and can measure the evaporator temperature, whereas the control device switches the motor of the compressor, which motor is driven at a constant frequency, on and off in function of said temperature. If this evaporator temperature drops too low, said motor is stopped. If the evaporator pressure subsequently rises too high because the expansion valve still is open, the motor is restarted.

Such regulation, however, is very disadvantageous in consideration of the fact that, with a small load, the compressor is switched on and off continuously, whereas also the evaporator pressure and the dew points strongly vary. Moreover, the condensation dryer has to be constructed rather large.

The measuring means can also be provided at the outlet of the secondary part of the heat exchanger and can measure the lowest air temperature (LAT), whereas the control device, if the temperature in the evaporator tends to drop below 0° C., switches off the motor of the compressor of the cooling circuit.

In both kinds of devices, the regulation thus is performed by switching the motor on and off, which, especially with a small load, will happen often, which causes considerable wear and tear of the compressor and is disadvantageous.

This disadvantage is avoided by a device as described in the first paragraph, in which the compressor is bridged-over by a bypass.

Such cool-drying device with bypass is described in DE-A-35.22.974.

The motor is fed with a constant frequency, but is switched on and off by means of a control device formed by a pressure switch, in function of the pressure of the cooling fluid measured between the heat exchanger and the compressor.

When the pressure in the suction conduit of the compressor drops below a certain value which, for example, corresponds to a temperature of the cooling fluid of −15° C., the motor is switched off, as a result of which an excessive temperature drop in the suction conduit is avoided.

In order to improve the efficiency of the device, the compressor is bridged-over by a bypass in which, apart from the classic bypass-closing element, also a controlled on/off closing element is disposed.

The bypass-closing element is of a known type which is pushed open when the pressure in the bypass at the side of the inlet of the compressor drops below a certain settable value, as a result of which hot gases are suctioned from the compressor.

Said closing element and the set pressure, whereby the spring no longer keeps the closing element shut, are chosen such that with nominal operating conditions of the cooling circuit, the closing element is closed, but with partial and zero load of the compressor, this closing element is open, such that the evaporator pressure with a hysteresis of 0.2 bar is kept at a minimum, and such that the evaporation temperature, which is coupled to the evaporation pressure of the cooling fluid, downstream of the evaporator is at least 0° C. in order to prevent the formation of ice in the evaporator.

If exclusively the bypass-closing element would be present in the bypass, this would result in that the compressor remains operating on full load, even with zero-load conditions. In consideration of the fact that the compressor motor is working continuously, the energy consumption even with no or low load therefore is equal to the energy consumption with nominal load as the high and low pressure in the cooling circuit are continuously kept constant, thus resulting in a relatively high energy consumption.

By adding an open/closed closing element into the bypass conduit, as described in DE-A-35.22.974, the efficiency of the device is improved. This additional open/closed closing element is controlled by a thermal switch which is controlled by a temperature measuring means which is disposed in the gas conduit, at the outlet of the heat exchanger. Said closing element is set such that it opens the bypass when the gas temperature at the outlet of the heat exchanger is approximately equal to the temperature at which the moisture in the gas starts to freeze.

When the temperature of the compressed air at said outlet, for example, is higher than 1° C., the closing element closes off the bypass, and the full cooling capacity is led over the evaporator, as a result of which the evaporation temperature in the evaporator, at full load, drops to −4 to −5° C., and therefore the temperature at the outlet will drop. As soon as this latter temperature becomes 1° C., the closing element opens the bypass, as a result of which the evaporation temperature in the evaporator will rise to, for example, 1.5° C., and moisture frozen on the evaporator evaporates again. The compressed air temperature after the evaporator rises again, and at, for example, 2° C. the closing element again closes off the bypass, and the motor can apply its entire power on the heat exchanger.

In this embodiment, freezing of the evaporator can be avoided even if the temperature of the cooling fluid temporarily drops below freezing temperature, such that the condensation-dryer can work with a higher load. However, the motor is driven continuously on full speed, such that energy consumption remains relatively high.

BRIEF SUMMARY OF THE INVENTION

The invention aims at a device for dehumidifying a gas by cool-drying which does not show the aforementioned and other disadvantages and with which in a simple manner, without pressure variations in the cooling circuit and without major wear and tear of the compressor and its motor, energy saving can be achieved.

According to the invention, this aim is realized in that the device for cool-drying comprises means for regulating the speed of the motor, whereas the control device controls these means in function of the value measured by the measuring means.

Instead of switching the motor on and off, its speed is adapted. By increasing the number of revolutions of the motor, a larger mass flow rate of cooling liquid can be transferred by pumping and therefore a larger cooling capacity can be delivered.

By the combination of the bypass with bypass-closing element and open/closed closing element with speed-controlled compressor, not only the number of times the motor is stopped and restarted is significantly reduced, but a major energy saving is possible. Other advantages thereof will be explained in the following.

The aforementioned measuring means can be provided at the cooling circuit and can be means for measuring the evaporator temperature or evaporation pressure.

Said measuring means, however, can also be provided at the conduit for the gas, in or upstream of the secondary part of the heat exchanger, and can be means for measuring the lowest gas temperature (LAT) or can be means for measuring the dew point.

Preferably, the means for regulating the speed of the motor consist of a frequency transformer.

In a particular form of embodiment of the invention, the cool-dryer comprises means for measuring the ambient temperature, which means are also coupled to the control device, and whereby this control device is such that it regulates the speed of the motor in function of the value measured by the measuring means as well as in function of the temperature measured by the means for measuring the ambient temperature.

The invention also relates to a method for cool-drying which, in an interesting manner, uses the device according to the invention described in the aforegoing.

Said invention thus relates to a method for cool-drying of gas containing water vapour, whereby this gas is fed through the secondary part of a heat exchanger, the primary part of which is the evaporator of a cooling circuit which also comprises a compressor which is bridged-over by a bypass wherein a bypass-closing element and a controlled open/closed closing element are provided and which is driven by an electric motor, a condenser, an expansions means between the outlet of the condensor and the inlet of the evaporator, and whereby the aforementioned cooling circuit is controlled in function of the load in such a manner that the cooling capacity is adapted without creating the formation of ice in the evaporator, and which is characterized in that the control of the cooling circuit takes place by regulating the speed of the motor and, moreover, by regulating the open/closed closing element such that, under certain conditions, it opens the bypass and, as the bypass-closing element no longer closes off the bypass, gaseous cooling fluid is conducted from the outlet of the compressor back to its inlet, upstream or downstream of the evaporator.

BRIEF DESCRIPTION OF THE DRAWINGS

With the intention of better showing the characteristics of the invention, hereafter, as an example without any limitative character, several preferred forms of embodiment of a device and method for cool-drying according to the invention are described, with reference to the accompanying drawings, wherein.

DETAILED DESCRIPTION.

Figure 1:
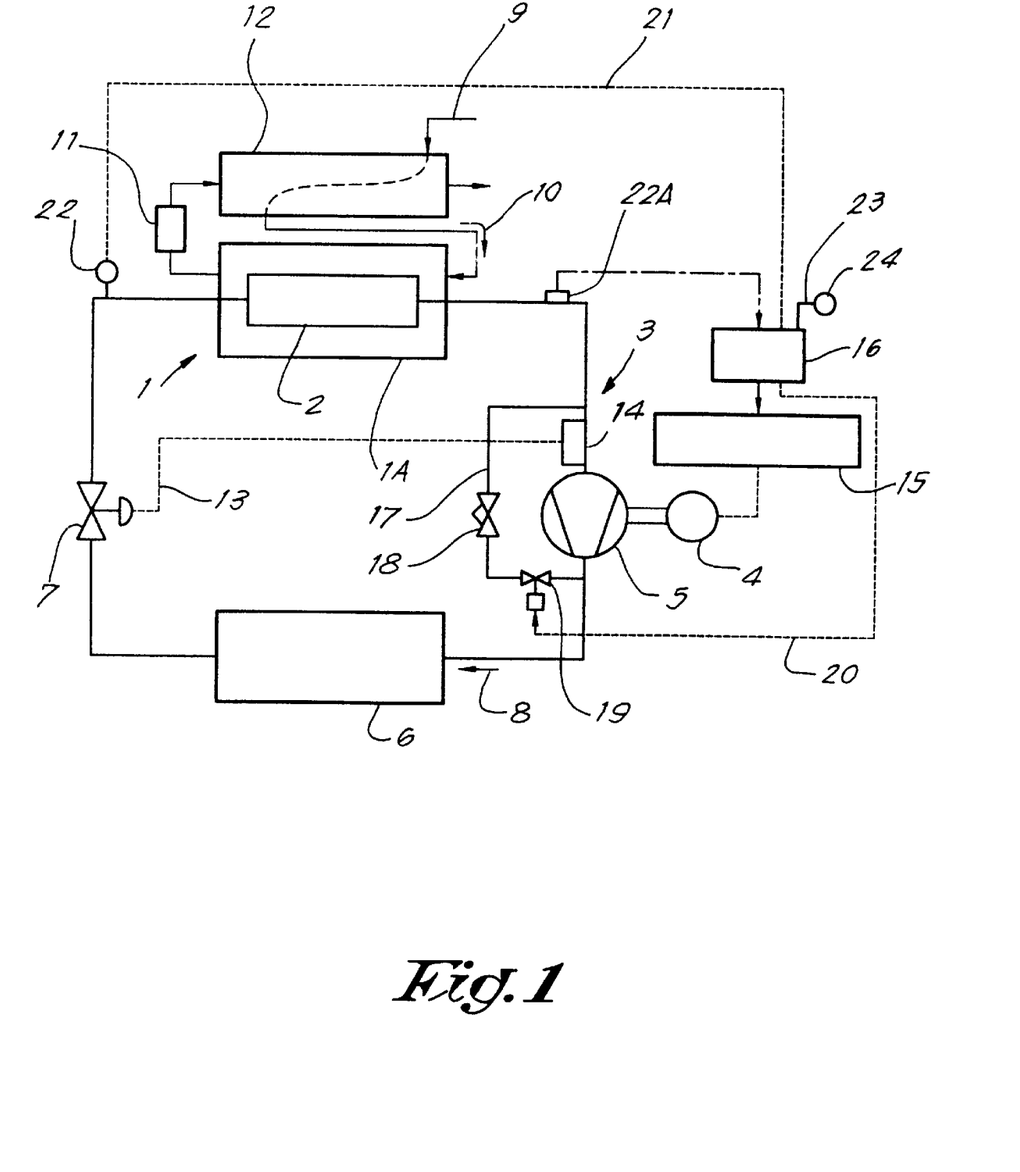
FIG. 1 represents a block diagram of a device for cooldrying according to the invention.

The device for cool-drying which is schematically represented in FIG. 1, substantially comprises a heat exchange 1, the primary part of which forms the evaporator 2 of a cooling circuit 3 in which, successively, also a compressor 5, driven by an electric motor 4, a condenser 6 and an expansion valve 7 are disposed.

This cooling circuit 3 is filled with a cooling medium or fluid, for example, Freon 404a, the flow direction of which is represented by arrow 8.

The secondary part 1A of the heat exchanger 1 forms part of the conduit 9 for humid air to be dried, the flow direction of which is indicated by arrow 10.

After the heat exchanger 1 and, thus, at its outlet, a liquid separator 11 is disposed in conduit 9.

Possibly, said conduit 9, before reaching the heat exchanger 1, may extend with a portion through a pre-cooler or recuperative heat exchanger 12 and subsequently, downstream of liquid separator 11, again extend through the recuperative heat exchanger 12, in reverse flow direction to the aforementioned portion.

The heat exchanger 1 is a liquid-air heat exchanger and may form a single constructive unit with the possible recuperative heat exchanger 12 which is an air-air heat exchanger.

The expansion valve 7 is a thermostatic valve, the thermostatic element of which, by means of a copper conductor 13, is coupled to a flask-shaped container or "bulb" 14 which is provided at the outlet of the evaporator 2 but, preferably such as represented in FIG. 1, at the inlet of compressor 5, at the cooling circuit 3 and which is filled with the same cooling medium.

In a variant not represented in the figures, said expansion valve 7, however, is an electronic valve which is coupled to a thermometer provided at the end of the evaporator 2 or downstream thereof.

In smaller cool-dryers, the expansion valve 7 may be replaced by a capillary.

Compressor 5 is a volumetric compressor which, with a same number of revolutions, practically delivers a same volume flow rate, for example, a spiral compressor, whereas the motor 4 is an electric motor, the speed of which can be regulated by altering the frequency.

Therefore, said motor 4 is coupled to a frequency transformer 15 controlled by a control device 16 which is formed by a built-in control device, for example, a PID control device.

Frequency transformer 15, for example, can regulate the frequency between 0 and 400 Hz and forms means for regulating the speed of the motor 4.

Compressor 5 is bridged-over by a bypass unit 17 or bridging element connecting the outlet to the inlet thereof or, which corresponds thereto, to the outlet of evaporator 2.

In said bypass 17, a classical bypass-closing valve or element 18 is provided, with a valve body which is pushed open by a spring as soon as the pressure in bypass 17 drops below a certain value. The counterpressure at which the spring pushes open this valve body and, thus, the aforementioned pressure, is adjustable.

In series with this bypass-closing element 18, and actually in between this latter and outlet of compressor 5, in bypass 17 furthermore an open/closed closing valve or element 19 is provided which is formed, for example, by an electromagnetic valve.

By means of electric connection 20, said open/closed closing element 19 is connected to control device 16 and is controlled by the latter.

In a first form of embodiment, represented in FIG. 1, control device 16, by means of a connection 21, is connected to measuring means or a first detection sensor 22 for measuring the evaporator temperature, for example, a thermo-coupling in cooling circuit 3, at the inlet of evaporator 2 and, therefore, between said evaporator 2 and expansion valve 7.

Although it clearly is preferred to measure the evaporator temperature, in a variant, however, the measuring means 22 for measuring the evaporator temperature can be replaced by means or a second detection sensor 22A for measuring the evaporation pressure, for example, a pressure transmitter with a pressure range from −1 to 12 bar, which is provided at the inlet or at the outlet of evaporator 2 and, by means of connection 21A, is connected to the control device, such as represented in dash-dotted line in FIG. 1.

For a given cooling fluid, there is in fact a relation between the evaporation temperature and the evaporation pressure of the cooling fluid. The higher the temperature, the higher the pressure.

Furthermore, in both cases the control device 16, by means of a conduit 23, also is connected with ambient temperature sensor or means 24 for measuring the ambient temperature, for example, a temperature sensor, and which transfers this temperature into an electrical signal, in particular a current.

The functioning of the condensation-dryer is as follows:

Air to be dried is fed through conduit 9 and, therefore, through heat exchanger 1, in counterflow to the cooling fluid in the evaporator 2 of the cooling circuit 3.

In said heat exchanger 1, the humid air is cooled, as a result of which condensate is formed which is separated in the liquid separator 11.

The cold air, which downstream of said liquid separator 11 contains less moisture, however, still has a relative humidity of 100%, is heated in the recuperative heat exchanger 12, as a result of which the relative humidity is lowered to approximately 50%, whereas the fresh air to be dried already is partially cooled in said heat exchanger 12 before being fed to heat exchanger 1.

The air at the outlet of regeneration heat exchanger 12 therefore is drier than at the inlet of heat exchanger 1.

In order to avoid freezing of evaporator 2, the air in heat exchanger 1 is not cooled below the LAT at low ambient temperatures, which LAT typically is 2–3° C.

At higher ambient temperature, the LAT may be higher, and cooling is performed up to a LAT which is considerably, for example, 20° C., lower than ambient temperature, however, in any case is not lower than the minimum temperature at which the risk of freezing of the evaporator may occur and which temperature typically is 2–3° C.

If the LAT is too high, cooling will not be sufficient and therefore there will not be sufficient condensed moisture in order to have the air sufficiently dried.

Said LAT is several degrees, for example, 2 to 3° C., above the actual evaporator temperature measured by measuring means 22.

The aforementioned conditions of LAT are fulfilled by regulating, by means of control device 16 and the frequency transformer 15 controlled thereby, the speed of the motor 4 in function of the evaporator temperature measured by measuring means. 22, in one form of embodiment, or the evaporator pressure measured by measuring means 22A in the other form of embodiment.

The cooling capacity is equal to the mass flow rate of cooling fluid circulating in cooling circuit 3, multiplied with the enthalpy difference of the air upstream and downstream of heat exchanger 1. By increasing the speed of motor 4, compressor 5 can circulate more mass and, therefore more power can be delivered with one and the same enthalpy difference. The mass flow is the volume flow rate of compressor 5, multiplied with the density of the cooling fluid in suctioning condition which itself depends on evaporator temperature and overheating.

Control device 16 adjusts the measured temperature or pressure by adapting the speed such that said temperature is several degrees lower than said LAT, however, higher than 0° C., respectively that the evaporator pressure is obtained which coincides with a temperature which is several degrees below the LAT and, for example, is equal to 1° C., whereby for Freon R404a, the evaporator pressure then is approximately 5,2 bar effectively.

In this manner, the cooling capacity is adapted to the load.

As also the ambient temperature is measured by means 24, control device 16 coupled thereto can take this temperature into account.

By means of control device 16 and the frequency transformer 15 controlled thereby, the speed of motor 4 then is regulated such that, as long as the ambient temperature is low, and more particularly is lower than 23° C., at a dew point interruption set at 20° C., the aforementioned condition is fulfilled and, thus, the LAT at the outlet of the secondary part 1A of heat exchanger 1 is approximately 3° C., however, at a higher ambient temperature, said LAT is set to a certain number of degrees, typically 20° C., below the ambient temperature measured by means 24.

The evaporator temperature has a set point, this is a set value to which control device 16 strives to bring the actually measured evaporator temperature, which value is several degrees below the desired LAT.

Possibly, a minimum and a maximum set point can be determined in control device 16, whereby the minimum is 1° C. When setting the control device 16, this set point can be adjusted, for example, by means of an operation panel or by means of an analogous input.

The frequency is regulated, for example, between 30 and 75 Hz.

The maximum load for the cool-drying device is relatively small in consideration of the fact that with higher ambient temperatures, the LAT may be higher than 3° C., as a result of which the cooling capacity diminishes and therefore the components may be less expensive and cooling fluid is economized.

In condenser 6, the gaseous cooling fluid heated in compressor 5 due to compression is cooled until it obtains liquid form, and for dissipating the heat, use can be made of a ventilator or cooling water.

With excessive pressure in the condenser 6, motor 4 is switched off automatically.

After condensor 6, the liquid cooling fluid possibly may be collected in a vessel and/or cooled further by means of an additional heat exchanger.

By means of expansion valve 7, the liquid cooling fluid is expanded up to an evaporator pressure, which, of course, will render a temperature reduction.

Expansion valve 7 only regulates the overheating in the evaporator 2 and provides for that evaporator 2 always is utilized in an optimum manner, however, it can not be used for controlling pressure or temperature of the evaporator.

By applying a thermostatic expansion valve 7, there is always an overheating downstream of evaporator 2, as a result of which there is no risk of cooling liquid in compressor 5, and a liquid separator in cooling circuit 3 becomes redundant and the quantity of cooling fluid is restricted.

Said overheating is measured by subtracting the temperature measured by bulb 14 from the evaporator temperature measured either upstream of evaporator 2 (internal egalisation) or downstream of the evaporator (external egalisation). Said difference is compared to a set value by expansion valve 7 and, in case of deviation, the expansion valve 7 will correct this by opening or closing.

The degree of overheating has an influence on the LAT, however, it may be assumed that expansion valve 7 keeps said overheating approximately constant.

If necessary, this influence of overheating can be taken into account by, for example, a kind of master-slave regulation circuit. The slave regulation circuit is the regulation with the control device 16 described in the aforegoing, whereas the master regulation circuit should be able to adjust the set point of the evaporator pressure or temperature in function of the actual LAT and therefore, for example, might reduce the set point if the LAT remains too high because the overheating after evaporator 2 is too high.

Without bypass 17, in the regulation circuit described heretofore it may be possible that the adaptation of the speed of motor 4 and compressor 5 is not performed as fast as the dropping of the dew point or, in other words, that the speed regulation can not follow the temperature alteration in evaporator 2.

This problem may occur in the first place under the conditions of partial load and zero load of the device.

Opening or not of bypass 17 in the first place is determined by open/closed closing element 19, which is controlled by control device 16.

Once open/closed closing element 19 has opened bypass 17, it is bypass-closing element 18 which determines when bypass 17 actually is opened.

Said bypass-closing element 18 does no longer close off bypass 17 from the moment that the evaporation pressure or evaporator pressure or, in a variant, the evaporation temperature at its outlet, this is, thus, in bypass 17 at the side of the inlet of compressor 5, drops below a certain value, as a result of which hot gases from compressor 5 can flow through bypass 17 and the evaporator pressure does not drop further.

Said bypass-closing element 18 and the set pressure whereby the spring no longer keeps this latter closed tight, are chosen such that with nominal working conditions of the cooling circuit, bypass-closing element 18 is closed, however, with partial and zero load of the compressor, said bypass-closing element 18 is open, such that the evaporator pressure with an hysteresis of 0.2 bar is maintained on a minimum, and such that the evaporation temperature which is coupled to the evaporation temperature of the cooling fluid, downstream of the evaporator is at least 0° C. in order to avoid the formation of ice in the evaporator.

The conditions whereby the regulation device 16 brings the open/closed closing element 19 into open position, may vary depending whether it is substantially desired to avoid freezing of evaporator 2 or preference is given to saving energy.

A first manner consists in that control device 16 brings open/closed closing element 19 into open position, as the speed of motor 5 reaches a minimum.

A second manner, which is preferred, consists in that control device 16 brings open/closed closing element 19 into open position when the value, for example, the evaporator temperature or the evaporation pressure measured by measuring means 22 or 22A, is lower than the set point which is aspired for said value, and thus, for example, the evaporator temperature or evaporation pressure, by control device 16 which also regulates the speed of motor 4.

More specifically is the open/closed closing element 19 brought into open position when the LAT has dropped below the set point with a value of −1.5° C., with, however, an absolute minimum for the LAT of, for example, 0.5° C., which can occur at partial load or zero load conditions of the device.

Opening of bypass 17 may lead to the LAT rising again. When this latter rises above the set point, the speed of motor 4 again will increase due to control device 6.

As this speed exceeds a certain value, control device 16 can bring open/closed closing element 19 back into closed position and, therefore, interrupt bypass 17 again.

In another form of embodiment, control device 16 brings open/closed closing element 19 again into closed position when the value, measured by measuring means 22 or 22A, is approximately equal to the set point for this value of said control device 16, for example, is equal to said set point minus 0.5° C.

If said LAT does not rise as bypass 17 opens completely, control device 16 possibly may switch off motor 4 temporarily in order to obtain an additional saving of energy.

Although the evaporator temperature is adjusted by alteration of the speed, the possibility can be provided, for the case that the load is zero, to switch off motor 4 completely, for safety, when the LAT at the outlet of heat exchanger 1 tends to drop below 0° C., for example, by placing a thermostatic sensor into the heat exchanger 1 which, should the temperature in evaporator 2 become zero degrees, switches off motor 4 and starts it again when the temperature has risen to 3° C.

As a result of the combination of bypass 17, provided with bypass-closing element 18 and open/closed closing element 19, on one hand, and speed-regulated compressor 5, on the other hand, not only the number of times that motor 4 is stopped and restarted is drastically reduced, but also a strongly improved dynamic behaviour is obtained.

When, for example, the load of the cool-drying device suddenly changes from full load to partial load by, for example, a reduction of the compressed air flow rate, the LAT will drop and the number of revolutions of the compressor will diminish due to control device 16 which strives to maintain the set point.

If the number of revolutions of compressor 5 would not be reduced fast enough, then it is very likely that the LAT drops below 0° C. (undershoot) in the absence of bypass 17. In that case, compressor 5 will have to be switched off in order to avoid the formation of ice in evaporator 2, which surely results in heavily varying pressure dew points.

However, in the presence of bypass 17, when the LAT drops below the set point or when the LAT approaches the freezing point, the open/closed closing element 19 in bypass 17 will be opened, which prevents the LAT from dropping below 0° C.

Another advantage of bypass 17 with bypass-closing element 18 and open/closed closing element 19 in combination with the speed-regulated motor 4 is an increase of the load range with a stable pressure dew point towards below. In absence of the bypass, as the load of the dryer gradually diminishes, for a certain load the speed of the compressor will be minimum.

With a further reduction of the load, the LAT will drop below the set point and finally drop below 0° C. In this case, compressor 5 will have to be switched off in order to prevent the formation of ice in the evaporator 2, which surely will result in heavily varying pressure dew points.

When the load of the dryer gradually diminishes, with a certain load the speed of compressor 5 also will be minimum in the presence of bypass 17.

With a further reduction of the load, the LAT will drop below the set point, which opens the open/closed closing element 19 in bypass 17. The set point still will be maintained, which results in stable pressure dew points.

The dynamic behaviour of the device is clearly improved. Due to the controlled open/closed closing element 19 in bypass 17, the range of load with stable pressure dew point is enlarged towards below.

Figure 2:
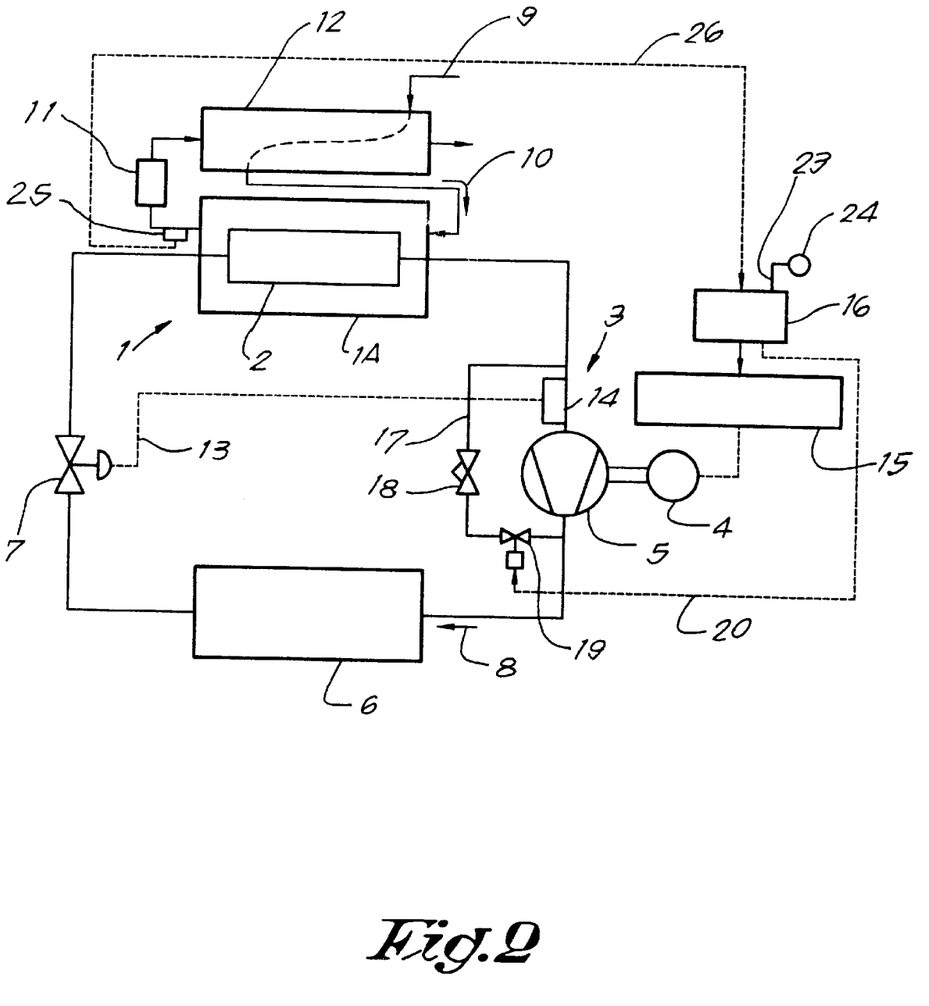
FIGS. 2 to 4 represent block diagrams analogous to that from FIG. 1, however, in respect to three other forms of embodiment of the invention.

The form of embodiment of the device represented in FIG. 2 substantially differs from the forms of embodiment described in the aforegoing in that the measuring means 22 provided at cooling circuit 3 for measuring the evaporator temperature or the measuring means 22A for measuring the evaporation pressure are replaced by measuring means 25 for measuring the lowest air temperature (LAT).

Said temperature-measuring means 25 which in an embodiment are already present for controlling the speed of motor 4, are disposed at conduit 9, either in the secondary part 1A of heat exchanger 1, for example, at the surface of evaporator 2, or, as represented in FIG. 2, downstream from heat exchanger 1, for example, between said heat exchanger 1 and liquid separator 11.

In this form of embodiment, control device 16 regulates frequency transformer 15 and, thus, the speed of motor 4 in function of the measured lowest air temperature LAT.

The measurement of the LAT renders the important advantage that the temperature of the cooling fluid can be lower than 0° C. without a freezing-up of the evaporator, in other words, before ice is being formed at the air side of the evaporator, as this phenomenon is determined by the LAT.

In consideration of the fact that evaporation is possible with low evaporator temperatures, for example −5° C., at the side of the cooling fluid, and with large temperature differences, such as, for example, 8° C. (between +3° C. and 5° C.), without the risk of freezing, heat exchanger 1 may be realized very compact.

If the measured lowest air temperature LAT rises or drops, control device 16 commands the increase, diminishing, respectively, of the speed of motor 4, such that this measured LAT temperature does not drop below the LAT at low ambient temperature, which LAT typically is 2 to 3° C., in order to guarantee for that evaporator 2 does not freeze.

If the ambient temperature measured by thermometer 24 is lower than 23° C., with a dew point interruption which is set to 20° C., the measured LAT may not drop below, for example, approximately 3° C. in order to guarantee for that evaporator 2 does not freeze.

Thus, due to this regulation the cooling is adapted to the load, whereby the evaporator temperatures at the side of the cooling fluid may become negative without, however, having evaporator 2 freezing at the side of the air.

Consequently, not only the energy consumption of motor 4 is minimum, but heat exchanger 1 may be manufactured very compact, which also means an economization in respect to the price of the device.

Also in this form of embodiment, the overheating in evaporator 2 is regulated by expansion valve 7 by which the cooling fluid is expanded.

The working of bypass 17 is such as above-described in the form of embodiment according to FIG. 1, in that variant in which opening and closing of open/closed closing element 19 is controlled in function of the value of the evaporator temperature or evaporation pressure measured by measuring means 22 or 22A. In the form of embodiment according to FIG. 2, open/closed closing element 19, however, is controlled in function of the value measured by measuring means 25 instead of measuring means 22 or 22A.

Although the lowest air temperature is adjusted by varying the speed of motor 4, also in this form of embodiment the possibility can be provided to switch off motor 4 completely in the case of zero load.

In a variant of the preceding form of embodiment, which variant is not represented in the figures, temperature measuring means 25 for measuring the lowest air temperature are replaced by measuring means for measuring the dew point of said air. Such measuring means or dew point meters are on the market and therefore will not be described further.

Thus, instead of the LAT, at the same place the dew point of the air is measured. The working is analogous to the working described heretofore, whereby thus the speed of motor 4 is regulated in such a manner that cooling in heat exchanger 1 is optimum, but freezing of evaporator 2 is avoided.

Figure 3:
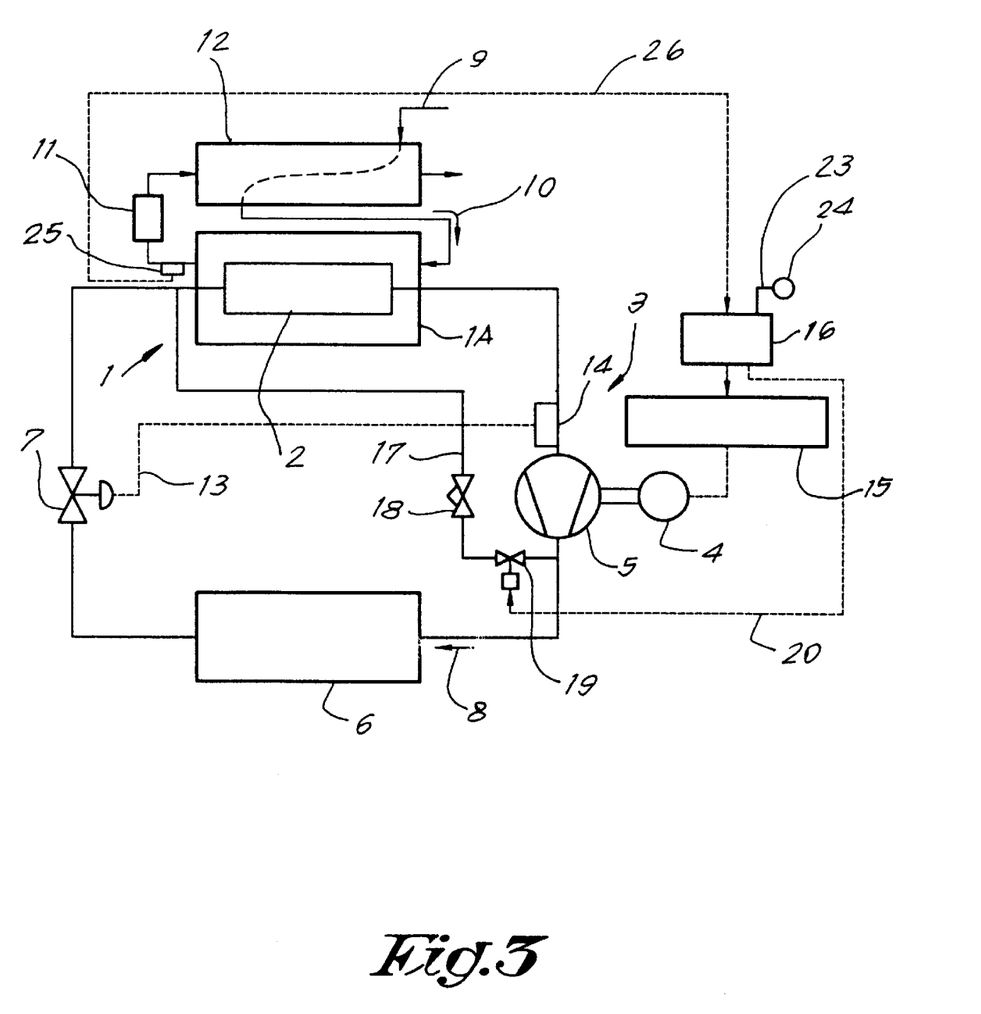

The form of embodiment of the device for cool-drying represented in FIG. 3 differs from the device according to FIG. 2, device described in the aforegoing, in that the extremity of bypass 17 which connects to cooling circuit 3 at the inlet side of compressor 5 is not connected to this cooling circuit 3 in between the compressor 5 and the outlet of evaporator 2, but at the inlet of evaporator 2.

Further, the functioning is as described heretofore. Open/closed closing element 19 does not necessarily have to be controlled by the same control device 16 as motor 5, but may be controlled by a separate control device, for example, a P, PI or PID controller.

Figure 4:
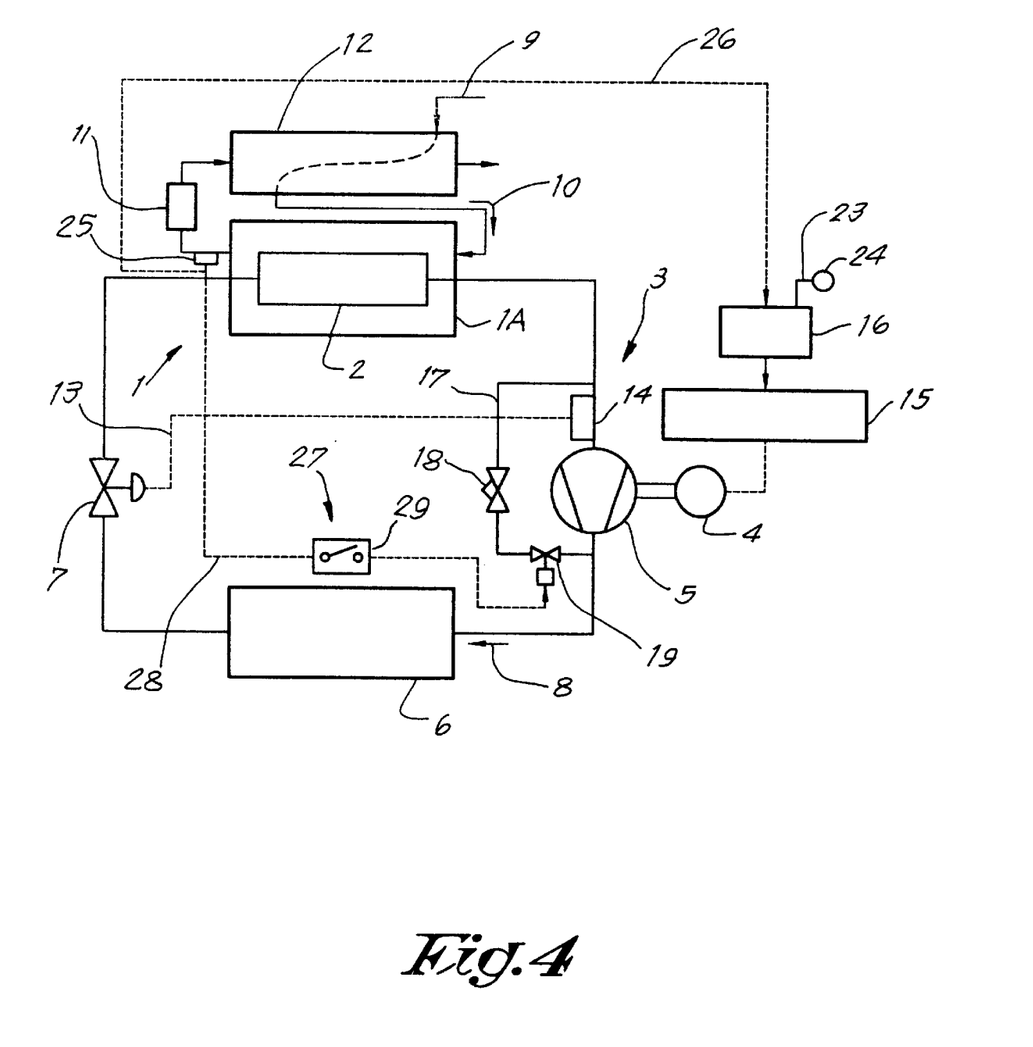

In the form of embodiment represented in FIG. 4, open/closed closing element 19 even is not controlled by such control device, but by a thermostat 27, the sensor of which or, in other words, the temperature measuring means in conduit 9, is provided at the outlet of heat exchanger 1 and, in the represented example, corresponds to temperature measuring means 25 connected to control device 16.

Thermostat 27 further comprises a connection 28 connecting said sensor 25, by means of a thermoswitch 29, to open/closed closing element 19.

When the temperature of the compressed air in conduit 9 at the outlet of heat exchanger 1 drops below a certain value, for example, drops below the set point of control device 16, thermoswitch 29 will be closed and open/closed closing element 19 will be actuated and therefore switch into open position. The functioning of bypass-closing element 18 and the control of motor 4 remain such as described above.

The invention is in no way limited to the forms of embodiment described in the aforegoing and represented in the accompanying drawings, on the contrary may such method and device for cool-drying be realized in different variants without leaving the scope of the invention.

In particular, instead of a control device 16, the control device may comprise another control device, for example, a PID, PI or P controller.

Although it is preferred to take the ambient temperature into account for, amongst others, restricting the power of the device, in a more simple embodiment the adjustment of the speed of motor 4 may be performed exclusively in function of the evaporator temperature, the evaporator pressure, the lowest gas temperature or the dew point of the gas.

Instead of humid air, gas other than air comprising water vapour may be dried in the same manner and with the same device. In such case, the LAT is the lowest gas temperature.

What is claimed is:

1. A device for dehumidifying a gas by performing a cool-drying operation comprising:
   a heat exchanger having a first part including an evaporator and a second part including a conduit arranged to receive a gas to be dehumidified and a liquid separator disposed within said conduit, said conduit arranged in communication with said evaporator;
   a compressor for compressing a cooling medium, said compressor driven by a motor;
   a condenser arranged to condense said cooling medium;
   an expansion device positioned between an outlet of the condenser and an inlet of the evaporator;
   a control device connected to said motor and arranged to control the speed of the motor;
   a bypass unit arranged to cause said cooling medium discharged from said evaporator to bypass said compressor, said bypass unit including a bypass closing valve and an open/closed valve;
   a cooling circuit obtained by piping said evaporator, said compressor, said condenser, said expansion device and said bypass unit;
   a plurality of detection sensors positioned along said cooling circuit;
   a control device connected to said motor and arranged to control the speed of the motor;
   wherein the speed of said motor is regulated by a speed adjustment device controlled by said control device to be dehumidified as a function of gas in said conduit and said cooling medium properties detected by said plurality of detection sensors.

2. The device according to claim 1 wherein a first detection sensor is positioned near said evaporator inlet and measures the evaporator temperature.

3. The device according to claim 1 wherein the a second detection sensor is positioned near an outlet of said evaporator and measures the evaporation pressure.

4. The device according to claim 1 wherein a conduit sensor is in communication with the second part of the heat exchanger and arranged to measure the lowest gas temperature of said gas.

5. The device according to claim 1 wherein a conduit sensor is in communication with the second part of the heat exchanger and arranged to measure the dew point of said gas.

6. The device according to claim 1 wherein the speed adjustment device includes a frequency transformer.

7. The device according to claim 1 further comprising an ambient temperature sensor arranged to measure the ambient temperature of said gas, said ambient temperature sensor being coupled to said control device, said control device regulating the speed of the motor as a function of values measured by said plurality of detection sensors, a conduit sensor to measure at least one property of said gas and said ambient temperature sensor.

8. The device according to claim 1 wherein said control device is a PID controller, a PI controller or a P controller.

9. The device according to claim 1 wherein the bypass closing valve opens when pressure in said bypass unit at a location near an inlet of the compressor drops below a predetermined value.

10. The device according to claim 1 wherein the bypass closing valve opens when the temperature in said bypass unit near an inlet of the compressor drops below a predetermined value.

11. The device according to claim 1 wherein the open/closed valve is connected to the control device.

12. The device according to claim 1 wherein the open/closed valve is connected to a thermostat connected to a conduit sensor disposed along said conduit and positioned near an evaporator outlet for said conduit.

13. A method for dehumidifying a gas by performing a cool-drying operation, the method comprising the steps of:
   feeding a gas through a conduit including a liquid separator that extends through a second part of a heat exchanger having first and second parts, said first part of the heat exchanger including an evaporator forming a segment of a cooling circuit circulating a cooling medium and obtained by piping said evaporator, a compressor, a condenser and a bypass unit, said bypass unit including a bypass closing valve and an open/closed valve;
   controlling said cooling circuit by regulating the speed of a motor connected to said compressor, said compressor compressing and discharging said cooling medium, wherein said cooling circuit is controlled and regulated so as to prevent formation of ice in the evaporator: and
   regulating said open/closed valve and said closing valve of said bypass unit such that the cooling medium discharged from said compressor at an outlet of said compressor is directed to flow through said bypass unit to an inlet of said compressor.

14. The method according to claim 13 further comprising the steps of measuring the evaporator temperature and controlling the cooling circuit as a function of said evaporator temperature.

15. The method according to claim 13 wherein the speed of said motor is regulated as a function of the evaporator temperature, the evaporator temperature being a value lower than and near a lowest gas temperature of said gas, said lowest gas temperature being maintained at a temperature above a freezing temperature of said gas.

16. The method according to claim 13 further comprising the steps of measuring the evaporation pressure and controlling the cooling circuit as a function of the evaporation pressure.

17. The method according to claim 13 further comprising the steps of measuring a lowest gas temperature of said gas and controlling the cooling circuit as a function of the lowest gas temperature.

18. The method according to claim 17 wherein the lowest gas temperature is measured at an outlet of said second part of the heat exchanger.

19. The method according to claim 13 further comprising the steps of measuring the dew point of the cooling gas and controlling the cooling circuit as a function of the dew point.

20. The method according to claim 13 further comprising the step of controlling the temperature of the cooling circuit such that the temperature at an inlet for the cooling medium located at one end of the evaporator is maintained at a freezing temperature while maintaining the temperature at another end of the evaporator above a freezing temperature of said gas.

21. The method according to claim 13 wherein the speed of the motor is regulated by altering a frequency of supplied power.

22. The method according to claim 13 further comprising the steps of measuring the ambient temperature and regulating the speed of the motor as a function of the ambient temperature.

23. The method according to claim 22 further comprising the steps of regulating the speed of the motor of the compressor such that the lowest gas temperature at an outlet of the evaporator has a value between a predetermined ambient temperature and a predetermined freezing temperature.

24. The method according to claim 13 further comprising the step of expanding said cooling medium with an a expansion valve positioned along said cooling circuit, said expansion valve being regulated as a function of a comparison between the temperature at an outlet of said evaporator and a predetermined value.

25. The method according to claim 13 further comprising the step of further drying the gas by passing and heating the gas through a recuperative heat exchanger positioned near said heat exchanger.

26. The method according to claim 13 further comprising the step of adjusting the bypass closing valve so as to permit said bypass unit to remain open regardless of predetermined levels of evaporation and evaporator pressure and evaporation temperature.

27. The method according to claim 13 further comprising the steps of:
   selecting an adjustment pressure such that the bypass closing valve remains closed during nominal operating conditions of said cooling circuit;
   closing said bypass closing valve under a partial or zero load on said compressor; and
   opening said bypass closing valve while evaporator pressure and evaporation temperature and pressure remain within predetermined levels so as to avoid formation of ice within said evaporator.

28. The method according to claim 13 wherein the control device adjusts said open/closed valve into an open position as the speed of the motor reaches a predetermined minimum level.

29. The method according to claim 13 wherein the control device adjusts the open/closed valve into an open position when a plurality of detecting sensors detect cooling circuit properties below predetermined minimum levels.

30. The method according to claim 28 wherein said open/closed valve is adjusted into an open position when a lowest air temperature has dropped below a predetermined minimum temperature.

31. The method according to claim 28 wherein the control device adjusts the open/closed valve into a closed position thereby preventing flow through said bypass unit when the speed of the motor exceeds a predetermined maximum level.

32. The method according to claim 27 wherein the open/closed valve is adjusted into a closed position when a value measured by a plurality of detecting sensors positioned along said cooling circuit is near a predetermined set point for said control device.

33. The method according to claim 13 wherein the opening and closing of said open/closed valve is controlled as a function of the lowest air temperature in the conduit at the outlet of the heat exchanger.

34. The method according to claim 13 wherein said control device switches off said motor if a value detected by a plurality of detecting sensors does not change upon complete opening of the bypass unit.

* * * * *